US012571570B2

(12) United States Patent
Lu et al.

(10) Patent No.: US 12,571,570 B2
(45) Date of Patent: Mar. 10, 2026

(54) HEAT DISSIPATION MODULE AND ANTI-CONDENSATION METHOD OF PROJECTION DEVICE

(71) Applicant: Coretronic Corporation, Hsin-Chu (TW)

(72) Inventors: Chenghan Lu, Hsin-Chu (TW); Chih-Sheng Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 203 days.

(21) Appl. No.: 18/217,633

(22) Filed: Jul. 3, 2023

(65) Prior Publication Data

US 2024/0003605 A1      Jan. 4, 2024

(30) Foreign Application Priority Data

Jul. 4, 2022    (CN) .......................... 202210781055.5

(51) Int. Cl.
*F25B 21/02* (2006.01)
*F25B 47/00* (2006.01)
*G03B 21/16* (2006.01)

(52) U.S. Cl.
CPC ........... *F25B 47/006* (2013.01); *F25B 21/02* (2013.01); *G03B 21/16* (2013.01); *F25B 2321/023* (2013.01); *F25B 2400/01* (2013.01); *F25B 2700/02* (2013.01); *F25B 2700/2104* (2013.01)

(58) Field of Classification Search
CPC ................ F25B 21/02; F25B 2321/021; F25B 2321/023; F25B 2400/01; F25B 2700/2104; F25B 2700/2107; F25B 47/006; F25B 2700/02

See application file for complete search history.

(56) References Cited

U.S. PATENT DOCUMENTS

| | | | | |
|---|---|---|---|---|
| 9,572,273 B2 * | 2/2017 | Blunier | ................ | A61B 1/0661 |
| 10,041,664 B2 * | 8/2018 | Ito | ......................... | F21V 29/503 |
| 10,448,525 B2 * | 10/2019 | Manahan | ................. | H05K 7/20 |
| 10,876,750 B2 * | 12/2020 | Haack | .................. | F24F 11/0008 |
| 10,935,877 B2 | 3/2021 | Tsai et al. | | |
| 11,029,713 B2 * | 6/2021 | Haven | .................. | G01D 11/245 |
| 11,183,371 B2 * | 11/2021 | Fujii | ................. | H01L 21/67248 |

(Continued)

FOREIGN PATENT DOCUMENTS

TW          597557 B      9/2017

*Primary Examiner* — Filip Zec

(57) ABSTRACT

A heat dissipation module of a projection device includes a heat generating component, a thermoelectric cooling chip, a heat insulating hollow body, a heating element and a control element. The thermoelectric cooling chip has opposite hot and cold ends. The cold end is connected to the heat generating component. The heat insulating hollow body has first and second openings communicating with each other. The thermoelectric cooling chip is disposed in and seals the first opening. The cold end is located in the heat insulating hollow body. The heat generating component is disposed in and seals the second opening. The heating element heats the heat insulating hollow body. The control component is electrically connected to the heating element and determines whether a temperature in the projection device reaches a dew point temperature and drives the heating element to heat the heat insulating hollow body accordingly. An anti-condensation method is also provided.

23 Claims, 7 Drawing Sheets

(56) References Cited

U.S. PATENT DOCUMENTS

| | | | |
|---|---|---|---|
| 11,397,047 B2* | 7/2022 | Nakane | F25D 17/042 |
| 2005/0166495 A1* | 8/2005 | Cho | E06B 7/12 52/204.5 |
| 2005/0236377 A1* | 10/2005 | Hoffman | H01J 37/3244 219/121.43 |
| 2007/0175396 A1* | 8/2007 | Kasai | C23C 16/45565 118/724 |
| 2010/0118279 A1* | 5/2010 | Itsuki | H04N 9/3144 353/54 |
| 2011/0037954 A1* | 2/2011 | Tsuchiya | H04N 9/3164 353/54 |
| 2012/0131930 A1* | 5/2012 | Fang | H10N 10/13 62/3.2 |
| 2021/0389651 A1* | 12/2021 | Matsui | H05K 7/2039 |
| 2023/0221627 A1* | 7/2023 | Lee | F28D 15/0275 353/52 |

* cited by examiner

100

100a

HEAT DISSIPATION MODULE AND ANTI-CONDENSATION METHOD OF PROJECTION DEVICE

CROSS-REFERENCE TO RELATED APPLICATION

This application claims the priority benefit of China application (No. 202210781055.5), filed on Jul. 4, 2022. The entirety of the above-mentioned patent application is hereby incorporated by reference herein and made a part of this specification.

FIELD OF THE INVENTION

The present invention relates to a heat dissipation module, and more particularly to a heat dissipation module of a projection device, and an anti-condensation method applicable to the heat dissipation module.

BACKGROUND OF THE INVENTION

With the requirements of the market for the brightness, color saturation, service life, non-toxic and environmental protection of projection devices, the types of light sources used in projection devices have evolved from ultra-high pressure mercury lamp (UHP lamp), light emitting diode (LED) to laser diode (LD). In general, the light source, light valve and other components in the projection device will continue to heat up when the projection device operates. Therefore, a heat dissipation module is usually disposed in the projection device, and the heat dissipation module mostly uses a thermoelectric cooling chip to cool the light source, light valve and other components, so as to prevent the temperature of these components from being too high.

However, as the brightness of the projection device continues to increase, the temperature of components such as light source and light valve during operation is also getting higher and higher, resulting in the thermoelectric cooling chip having to cool these components at a lower temperature. The temperature of the nearby air is easily lower than the dew point temperature when the cooling temperature provided by the thermoelectric cooling chip is too low, causing moisture to condense in the projection device and adhere to the components, thus reducing the service life of the projection device.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The present invention provides a heat dissipation module of a projection device to prevent condensation from occurring in the projection device.

The present invention provides an anti-condensation method applicable to the heat dissipation module of the projection device, so as to prolong the service life of the projection device.

Other advantages and objectives of the invention may be further illustrated by the technical features broadly embodied and described as follows.

In order to achieve one or a portion of or all of the objectives or other objectives, the heat dissipation module of the projection device provided by the present invention includes a heat generating component, a thermoelectric cooling chip, a heat insulating hollow body, a heating element and a control element. The thermoelectric cooling chip has a hot end and a cold end opposite to each other. The cold end is connected to the heat generating component by means of heat conduction. The heat insulating hollow body has a first opening and a second opening that communicate with each other. The thermoelectric cooling chip is disposed in the first opening and seals the first opening. The cold end is located in the heat insulating hollow body. The heat generating component is disposed in the second opening and seals the second opening. The heating element is configured to heat the heat insulating hollow body. The control component is electrically connected to the heating element and configured to determine whether a temperature in the projection device reaches a dew point temperature and drive the heating element to heat the heat insulating hollow body accordingly.

In an embodiment of the present invention, a thermal conductivity of the heat insulating hollow body is greater than, for example, 1 W/m·K.

In an embodiment of the present invention, a material of the heat insulating hollow body includes, for example, rubber.

In an embodiment of the present invention, the aforementioned heat dissipation module may further include a heat insulating layer. The heat insulating hollow body has an inner surface and an outer surface opposite to each other. The heat insulating layer is disposed on the inner surface. A thermal conductivity of the heat insulating layer is less than the thermal conductivity of the heat insulating hollow body.

In an embodiment of the present invention, a material of the heat insulating layer includes, for example, sponge.

In an embodiment of the present invention, the heat insulating layer may connect the thermoelectric cooling chip and the heat generating component.

In an embodiment of the present invention, the heating element is disposed on the inner surface or the outer surface, for example.

In an embodiment of the present invention, the heating element may be disposed on the inner surface, and the heat insulating layer covers the heating element.

In an embodiment of the present invention, the heat insulating hollow body may include an inner hollow body and an outer hollow body. The inner hollow body and the outer hollow body are spaced apart from each other. The first opening includes a third opening of the outer hollow body and a fourth opening of the inner hollow body. The second opening includes a fifth opening of the outer hollow body and a sixth opening of the inner hollow body. The thermoelectric cooling chip seals at least the fourth opening. The cold end is located in the inner hollow body. The heat generating component seals at least the sixth opening. The heating element is configured to heat the outer hollow body.

In an embodiment of the present invention, materials of the inner hollow body and the outer hollow body include, for example, rubber.

In an embodiment of the present invention, the inner hollow body and the outer hollow body may have different thicknesses.

In an embodiment of the present invention, the heat insulating hollow body may further include an intermediate hollow body. The intermediate hollow body is disposed between the inner hollow body and the outer hollow body and is spaced apart from the inner hollow body and the outer hollow body.

In an embodiment of the present invention, a material of the intermediate hollow body includes, for example, rubber.

In an embodiment of the present invention, the heat generating component may include a light valve or a light source.

In an embodiment of the present invention, the heat generating component includes the light valve and may further include a circuit board. The light valve is electrically connected to the circuit board. The circuit board is disposed in the second opening and seals the second opening. The light valve is disposed outside the heat insulating hollow body.

In an embodiment of the present invention, the heat generating component includes the light source. The light source is disposed in the second opening and seals the second opening.

In an embodiment of the present invention, the aforementioned heat dissipation module may further include a thermally conductive element. The thermally conductive element is connected between the heat generating component and the cold end and is located in the heat insulating hollow body.

In an embodiment of the present invention, the control component includes, for example, a processing element and a temperature and humidity sensing element. The processing element is electrically connected to the temperature and humidity sensing element and the heating element. The temperature and humidity sensing element is configured to detect the temperature and humidity in the projection device. The processing element is configured to drive the heating element to heat the heat insulating hollow body accordingly.

In an embodiment of the present invention, the temperature and humidity sensing element may be disposed on an outer surface of the heat insulating hollow body.

In an embodiment of the present invention, the temperature and humidity sensing element may include a temperature sensing member and a humidity sensing member. The temperature sensing member is disposed on an outer surface of the heat insulating hollow body, and the humidity sensing member is disposed in the projection device.

In order to achieve one or a portion of or all of the objectives or other objectives, the anti-condensation method provided by the present invention is applicable to the heat dissipation module of the projection device. The anti-condensation method includes the following steps: configuring the control component to determine whether a temperature in the projection device is lower than or equal to a dew point temperature; and configuring the control component to drive the heating element to heat the heat insulating hollow body when it is determined that the temperature in the projection device is lower than or equal to the dew point temperature.

In an embodiment of the present invention, after configuring the control component to drive the heating element to heat the heat insulating hollow body, the anti-condensation method may further include the following steps: configuring the control component to determine whether the temperature in the projection device is greater than the dew point temperature, and configuring the control component to turn off the heating element when it is determined that the temperature in the projection device is greater than the dew point temperature.

In an embodiment of the present invention, when configuring the control component to determine whether the temperature in the projection device is lower than or equal to the dew point temperature, the anti-condensation method may further include the following steps: configuring the temperature and humidity sensing element to detect the temperature and a humidity in the projection device; and configuring the processing element to determine whether the temperature in the projection device is lower than or equal to the dew point temperature according to the detected temperature and the humidity.

The heat dissipation module of the present invention adopts a heat insulating hollow body to thermally isolate the thermoelectric cooling chip, and the heat insulating hollow body is heated by a heating element when the temperature in the projection device is lower than or equal to the dew point temperature. Thus, the temperature of the heat insulating hollow body can be raised above the dew point temperature, thereby preventing the condensation of water vapor near the heat insulating hollow body due to the low temperature. Therefore, the heat dissipation module of the present invention can effectively prevent condensation from occurring in the projection device. The anti-condensation method of the present invention is applicable to the heat dissipation module of the projection device, and therefore can effectively prevent condensation from occurring in the projection device, so that the service life of the projection device can be prolonged.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
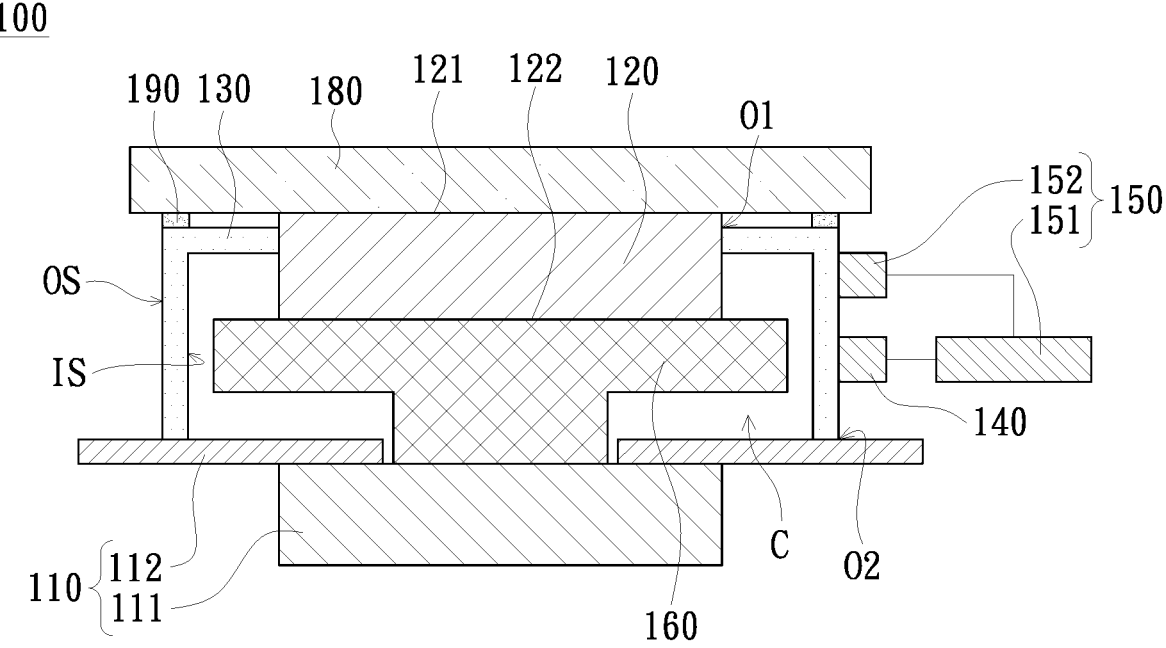
FIG. 1 is a schematic cross-sectional view of a heat dissipation module of a projection device according to an embodiment of the present invention.

FIG. 1 is a schematic cross-sectional view of a heat dissipation module of a projection device according to an embodiment of the present invention. Referring to FIG. 1, the heat dissipation module 100 is disposed in the projection device (not shown). The heat dissipation module 100 of the projection device includes a heat generating component 110, a thermoelectric cooling chip 120, a heat insulating hollow body 130, a heating element 140 and a control component 150. The thermoelectric cooling chip 120 has a hot end 121 and a cold end 122 opposite to each other. The cold end 122 is connected to a part of the heat generating component 110 by means of heat conduction. The heat insulating hollow body 130 has a first opening O1 and a second opening O2 that communicate with each other. The thermoelectric cooling chip 120 is disposed in the first opening O1 and seals the first opening O1. The cold end 122 is located in the heat insulating hollow body 130. The heat generating component 110 is disposed in the second opening O2 and seals the second opening O2. The heat generating component 110 is connected to the heat insulating hollow body 130. The heating element 140 is configured to heat the heat insulating hollow body 130. The control component 150 is electrically connected to the heating element 140. The control component 150 is configured to determine whether the temperature in the projection device reaches a dew point temperature and drive the heating element 140 to heat the heat insulating hollow body 130 accordingly. In other embodiments, the control component 150 is configured to determine whether the temperature of the heat insulating hollow body 130 in the projection device reaches a dew point temperature and drive the heating element 140 to heat the heat insulating hollow body 130 accordingly.

The heat generating component 110 may include a heat generating source of the projection device, such as a light valve or a light emitting source, and a light valve 111 is used as an example in this embodiment. The light valve 111 is, for example, a digital micromirror device (DMD) or a reflective liquid crystal on silicon (LCOS). The heat generating component 110 of this embodiment may further include a circuit board 112. The light valve 111 is electrically connected to the circuit board 112. The circuit board 112 is disposed in the second opening O2 and seals the second opening O2. The light valve 111 is disposed outside the heat insulating hollow body 130. However, the light valve 111 may seal the second opening O2 in other embodiments, and the present invention does not limit the manner of sealing the second opening O2. Incidentally, the circuit board 112 of this embodiment may provide electrical signals to the light valve 111, but the present invention does not limit the specific use of the circuit board 112. The circuit board 112 may also provide electrical signals to the thermoelectric cooling chip 120, the heating element 140 and the control component 150 in other embodiments.

Figure 2:
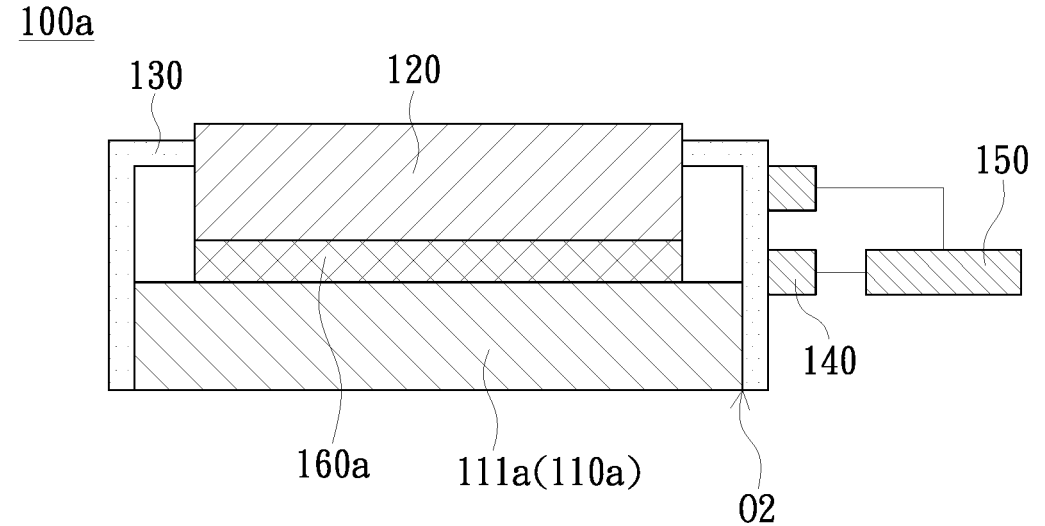
FIG. 2 is a schematic cross-sectional view of a heat dissipation module of a projection device according to another embodiment of the present invention.

It is understood that the heat generating source of the heat generating component 110 in other embodiments is not limited to the light valve 111. For example, referring to the heat dissipation module 100*a* of FIG. 2, the heat generating source of the heat generating component 110*a* may include a light source 111*a*. The light source 111*a* is disposed in the second opening O2 and seals the second opening O2, but the present invention does not limit the manner of sealing the second opening O2. The light source 111*a* of this embodiment may include a light emitting diode (LED) or a laser diode (LD), wherein the number of the light emitting diode or the laser diode may be one or plural. Specifically, the light emitting diodes (or laser diodes) may be arranged in a matrix when the number of light emitting diodes (or laser diodes) is plural.

Refer to FIG. 1 again. The cold end 122 of the thermoelectric cooling chip 120 needs to maintain a low temperature continuously so as to absorb the thermal energy generated when the heat generating component 110 is heated up. On the other hand, the hot end 121 of the thermoelectric cooling chip 120 can dissipate heat, so the hot end 121 can be connected to the heat dissipation device 180 of the heat dissipation module 100. The heat dissipation device 180 may include components with heat dissipation functions, such as heat dissipation pipes (not shown) and heat dissipation fins (not shown). In addition, the heat dissipation module 100 may further include filling glue 190. The filling glue 190 is used for enhancing the air tightness of the heat insulating hollow body 130 and isolating the outside air from contacting the hot end 121 of the thermoelectric cooling chip 120. Incidentally, the heat dissipation device 180 and the filling glue 190 are omitted in the embodiments of FIGS. 2, 5, 6, 7, 8 and 9.

Refer to FIG. 1 again. The heat insulating hollow body 130 of this embodiment can thermally insulate the cold end 122 of the thermoelectric cooling chip 120. In detail, the heat insulating hollow body 130, the thermoelectric cooling chip 120 and the heat generating component 110 can form an airtight cavity C. The cold end 122 of the thermoelectric cooling chip 120 is located in the airtight cavity C to prevent the temperature in the projection device from being too low due to the influence of the cold end 122. On the other hand, the temperature of the heat insulating hollow body 130 will be reduced by the influence of the cold end 122, so that the temperature of the air near the heat insulating hollow body 130 is likely to be close to or even lower than the dew point temperature, resulting in the moisture near the heat insulating hollow body 130 is more likely to condense on the surface of the heat insulating hollow body 130 to form water droplets. In this embodiment, the heating element 140 is configured to heat the heat insulating hollow body 130 to avoid the above dew condensation. Specifically, the heating element 140 may include a heating wire or a heater to heat the heat insulating hollow body 130 by means of thermal conduction, but the present invention does not limit these detailed features. In this embodiment, the thermal conductivity of the heat insulating hollow body 130 is, for example, greater than 1 W/m·K. In this way, the heat insulating hollow body 130 can be heated up quickly and uniformly when the heating element 140 heats the heat insulating hollow body 130, thereby further enhancing the anti-condensation effect. Specifically, the material of the heat insulating hollow body 130 may include rubber, but other embodiments are not limited thereto. Incidentally, in this embodiment, the joints of the heat insulating hollow body 130, the thermoelectric cooling chip 120 and the heat generating component 110 may be filled with the filling glue 190 to enhance air tightness and insulation.

Figure 3:
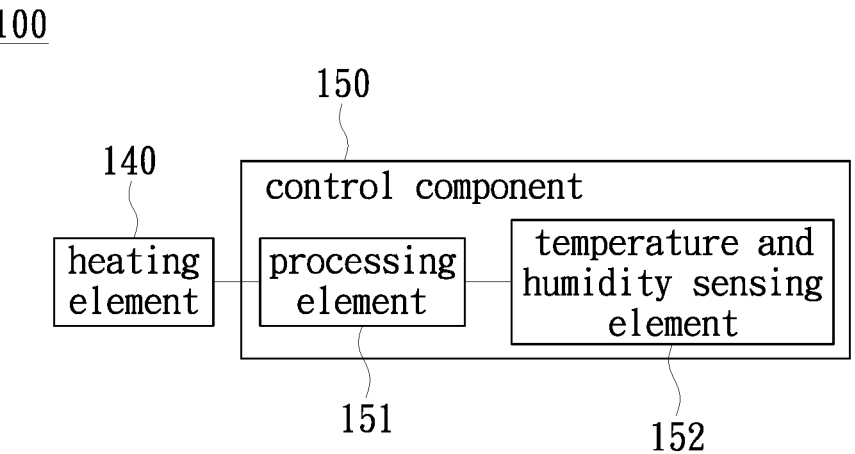
FIG. 3 is a schematic block diagram of a heat dissipation module of the projection device of FIG. 1.

Please refer to FIGS. 1 and 3 together. The control component 150 can detect the temperature of the heat insulating hollow body 130 and the humidity of the nearby air and determine whether to drive the heating element 140 to heat the heat insulating hollow body 130 accordingly. In detail, the control component 150 may include a processing element 151 and a temperature and humidity sensing element 152. The processing element 151 is electrically connected to the temperature and humidity sensing element 152 and the heating element 140. The temperature and humidity sensing element 152 is configured to detect the temperature of the heat insulating hollow body 130 and the humidity in the projection device, and the processing element 151 is configured to drive the heating element 140 to heat the heat insulating hollow body 130. Specifically, the heat insulating hollow body 130 has an inner surface IS and outer surface OS opposite to each other. The temperature and humidity sensing element 152 may be disposed on the outer surface OS of the heat insulating hollow body 130 to measure the above temperature and humidity. The heating element 140 may be disposed on the outer surface OS of the heat insulating hollow body 130. The processing element 151 can determine whether to drive the heating element 140 to operate according to the above temperature and humidity, and the detailed process will be described in the following paragraphs. In this embodiment, the processing element 151 may include a micro processing unit (MPU) or a central processing unit (CPU), but the present invention does not limit the types of the processing element 151.

Figure 4:
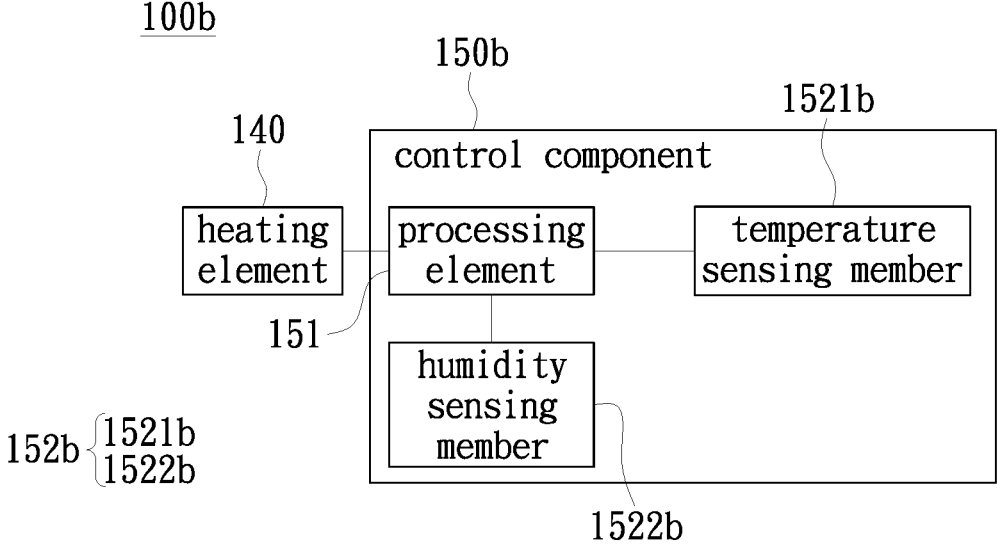
FIG. 4 is a schematic block diagram of a heat dissipation module of a projection device according to another embodiment of the present invention.

The temperature and humidity sensing element 152 of this embodiment is, for example, a temperature and humidity sensor. In another embodiment such as the heat dissipation module 100*b* of FIG. 4, the temperature and humidity sensing element 152*b* of the control component 150*b* may include a temperature sensing member 1521*b* and a humidity sensing member 1522*b*. The temperature sensing member 1521*b* is disposed on the outer surface OS of the heat insulating hollow body 130 (shown in FIG. 1) to measure the temperature of the heat insulating hollow body 130. The humidity sensing member 1522*b* is disposed on the outer surface OS of the heat insulating hollow body 130 (shown in FIG. 1), or the humidity sensing member 1522*b* may be disposed in the projection device, to measure the air humidity in the projection device. Further, the temperature sensing member 1521*b* can be a temperature sensor, and the humidity sensing member 1522*b* can be a humidity sensor.

The heat dissipation module 100 of this embodiment adopts the heat insulating hollow body 130 to thermally isolate the thermoelectric cooling chip 120, and the heating element 140 heats the heat insulating hollow body 130 when the temperature in the projection device is lower than or equal to the dew point temperature, so that the temperature of the heat insulating hollow body 130 can be raised to greater than the dew point temperature so as to prevent condensation of water vapor near the outer surface OS of the heat insulating hollow body 130 due to excessively low temperature. Therefore, the heat dissipation module 100 of this embodiment can effectively prevent dew condensation from occurring in the projection device.

Please refer to FIG. 1 again. Incidentally, the heat dissipation module 100 may further include a thermally conductive element 160. The thermally conductive element 160 is connected between the heat generating component 110 and the cold end 122 of the thermoelectric cooling chip 120 and located in the heat insulating hollow body 130. Further, the thermally conductive element 160 may be connected between the heat generating component 110 and the cold end 122 in a thermally conductive manner and be located in the airtight cavity C. For example, the thermally conductive element 160 of this embodiment may pass through the circuit board 112 and is connected to the light valve 111. However, the thermally conductive element 160*a* in the embodiment of FIG. 2 may be disposed between the light source 111*a* and the thermoelectric cooling chip 120. The present invention does not limit the specific connection method of the thermally conductive elements 160 and 160*a*. Incidentally, the material of the thermally conductive elements 160 and 160*a* may include copper or aluminum, but other embodiments are not limited thereto.

Figure 5:
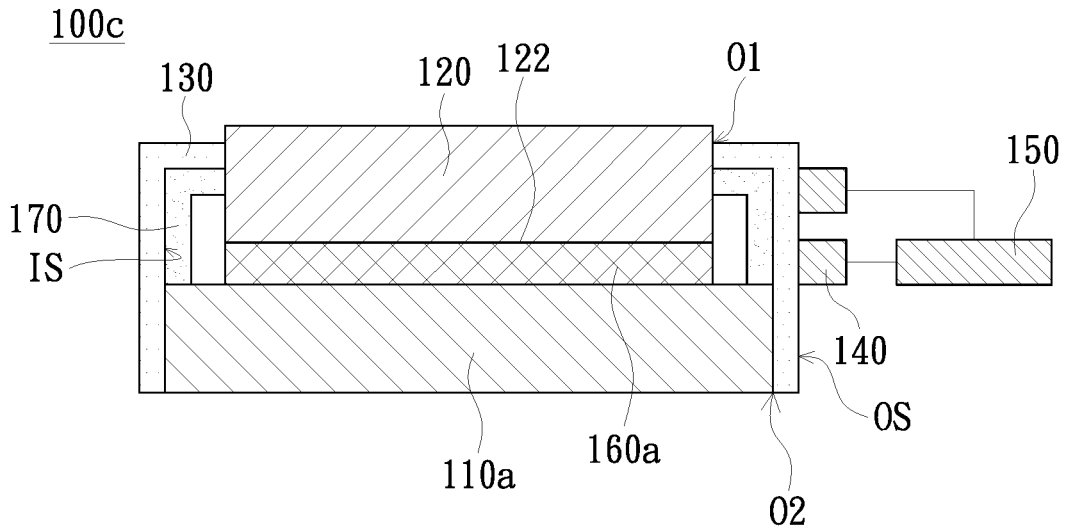
FIG. 5 is a schematic cross-sectional view of a heat dissipation module of a projection device according to another embodiment of the present invention.

FIG. 5 is a schematic cross-sectional view of a heat dissipation module of a projection device according to another embodiment of the present invention. The structure and advantages of the heat dissipation module 100*c* of this embodiment are similar to those of the previous embodiments, and only the differences are described below. Referring to FIG. 5, the heat dissipation module 100*c* may further include a heat insulating layer 170. The heat insulating layer 170 is disposed on the inner surface IS of the heat insulating hollow body 130. The thermal conductivity of the heat insulating layer 170 is smaller than that of the heat insulating hollow body 130 to more effectively thermally insulate the cold end 122 of the thermoelectric cooling chip 120 in the heat insulating hollow body 130. The thermal conductivity of the heat insulating layer 170 of this embodiment may be less than 1 W/m·K. In addition, the material of the heat insulating layer 170 may include sponge to additionally provide an airtight function. Furthermore, the heat insulating layer 170 may connect the thermoelectric cooling chip 120 and the heat generating component 110*a*. Specifically, the heat insulating layer 170 can seal the first opening O1 together with the thermoelectric cooling chip 120, and seal the second opening O2 together with the heat generating component 110*a*. In this way, the air tightness in the heat insulating hollow body 130 can be further improved, thereby isolating the cold end 122 of the thermoelectric cooling chip 120 in the heat insulating hollow body 130 more effectively. It can be understood that although the heat insulating layer 170 covers the entire inner surface IS of the heat insulating hollow body 130 as shown in FIG. 5, the heat insulating layer 170 in one embodiment may cover part of the inner surface IS of the heat insulating hollow body 130 in another embodiment, and the present invention is not limited thereto.

Figure 6:
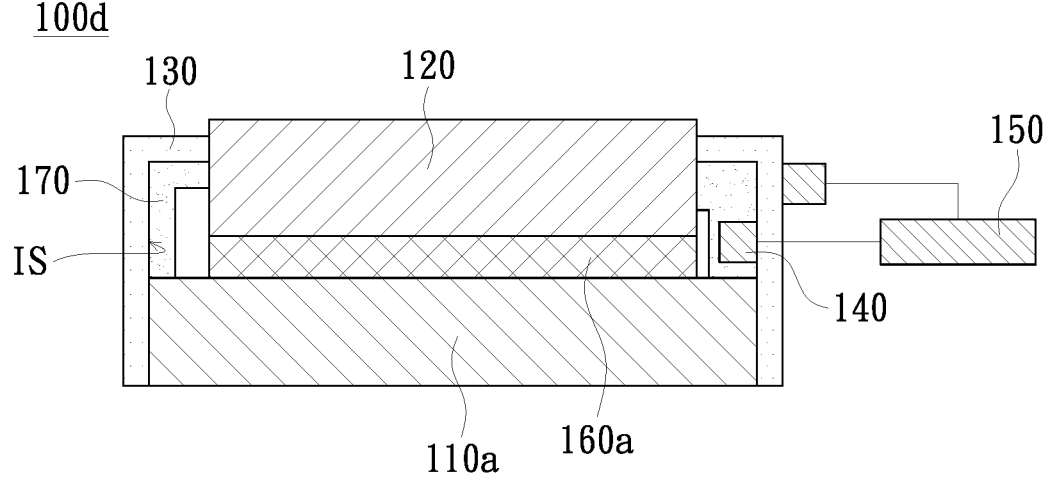
FIG. 6 is a schematic cross-sectional view of a heat dissipation module of a projection device according to another embodiment of the present invention.

The heating element 140 of this embodiment is, for example, disposed on the outer surface OS of the heat insulating hollow body 130, but other embodiments are not limited thereto. For example, in the heat dissipation module 100*d* of FIG. 6, the heating element 140 may be disposed on the inner surface IS of the heat insulating hollow body 130. Furthermore, the heat insulating layer 170 can cover the heating element 140 disposed on the inner surface IS to prevent the thermal energy generated by the heating element 140 from affecting the operation of the thermoelectric cooling chip 120. It can be understood that although FIGS. 5 and 6 illustrate the heat generating component 110*a* with a light source, other embodiments are not limited thereto.

Figure 7:
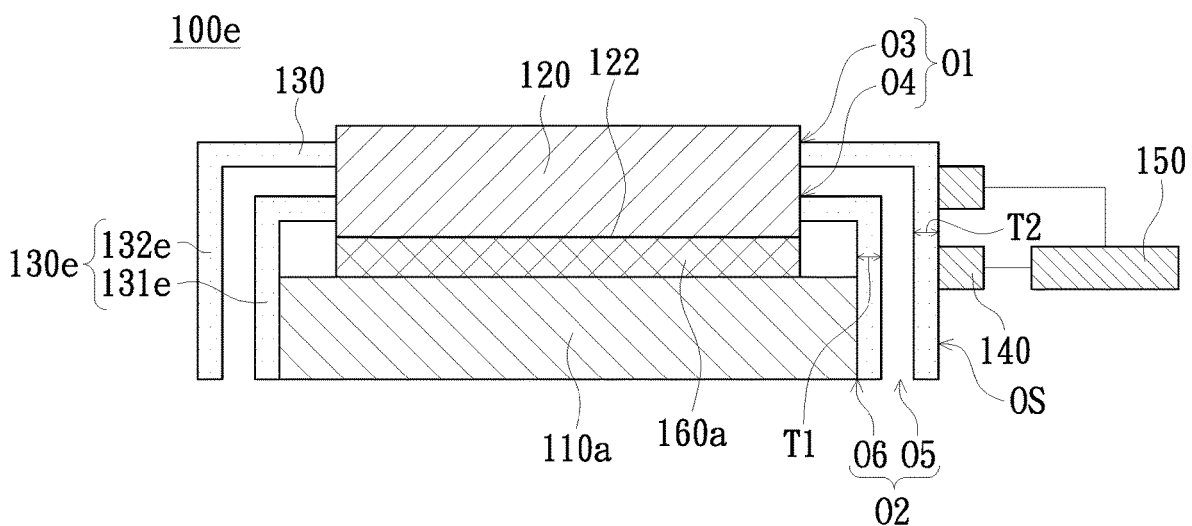
FIG. 7 is a schematic cross-sectional view of a heat dissipation module of a projection device according to another embodiment of the present invention.

FIG. 7 is a schematic cross-sectional view of a heat dissipation module of a projection device according to another embodiment of the present invention. The structure and advantages of the heat dissipation module 100*e* of this embodiment are similar to those of the previous embodiments, and only the differences are described below. Referring to FIG. 7, the heat insulating hollow body 130*e* may include an inner hollow body 131*e* and an outer hollow body 132*e*. The inner hollow body 131*e* and the outer hollow body 132*e* are spaced apart from each other. There is an air layer between the inner hollow body 131*e* and the outer hollow body 132*e*. The first opening O1 includes a third opening O3 of the outer hollow body 132*e* and a fourth opening O4 of the inner hollow body 131*e*, wherein the third opening O3 and the fourth opening O4 are, for example, positioned relative to each other. The second opening O2 includes a fifth opening O5 of the outer hollow body 132*e* and a sixth opening O6 of the inner hollow body 131*e*, wherein the fifth opening O5 and the sixth opening O6 are, for example, positioned relative to each other. The thermoelectric cooling chip 120 seals at least the fourth opening O4, and the cold end 122 is located in the inner hollow body 131*e*. The thermoelectric cooling chip 120 of this embodiment may further seal the third opening O3. The heat generating component 110 seals at least the sixth opening O6. The heating element 140 is configured to heat the outer hollow body 132*e*. Specifically, because the inner hollow body 131*e* and the outer hollow body 132*e* are spaced apart from each other, the air layer formed between the inner hollow body 131*e* and the outer hollow body 132*e* can further improve the thermal insulation of the heat insulating hollow body 130*e* on the cold end 122, so that the dew condensation in the projection device can be effectively prevented.

Figure 8:
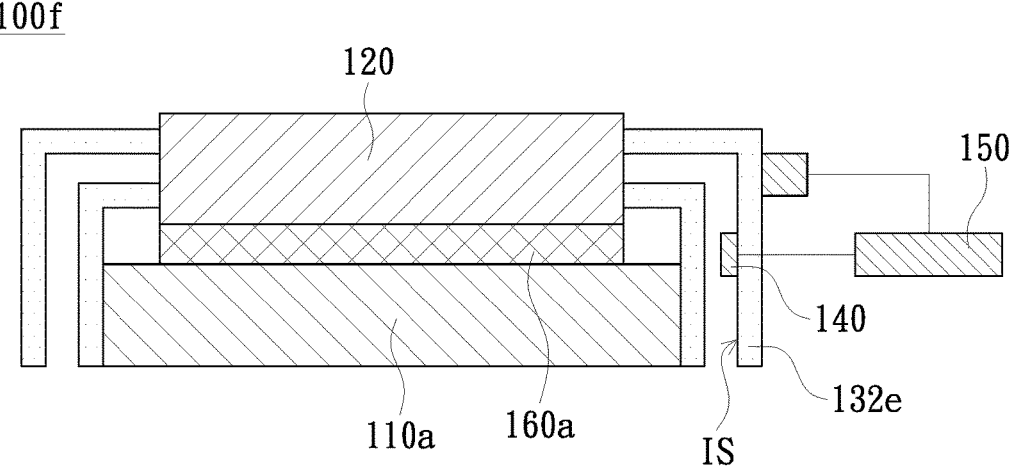
FIG. 8 is a schematic cross-sectional view of a heat dissipation module of a projection device according to another embodiment of the present invention.

In this embodiment, the heating element 140 may be disposed on the outer surface OS of the outer hollow body 132*e* to heat the outer hollow body 132*e*. However, in the heat dissipation module 100*f* of FIG. 8, the heating element 140 may be disposed on the inner surface IS of the outer hollow body 132*e* to heat the outer hollow body 132*e*. Please refer to FIGS. 7 and 8 together. The thermal conductivity of the inner hollow body 131*e* and the outer hollow body 132*e* is, for example, greater than 1 W/m·K, and the material of the inner hollow body 131*e* and the outer hollow body 132*e* may include rubber. It can be understood that the material of the inner hollow body 131*e* and the material of the outer hollow body 132*e* in other embodiments can be adjusted according to actual needs, and the present invention is not limited thereto. Please continue to refer to FIG. 7. The thickness T1 of the inner hollow body 131*e* and the thickness T2 of the outer hollow body 132*e* may be approximately the same in this embodiment. However, the thickness T1 of the inner hollow body 131*e* and the thickness T2 of the outer hollow body 132*e* may be different in other embodiments. In one embodiment, the thickness T1 of the inner hollow body 131*e* may be greater than the thickness T2 of the outer hollow body 132*e*, but both the thickness T1 of the inner hollow body 131*e* and the thickness T2 of the outer hollow body 132*e* can be adjusted according to actual needs, and the present invention is not limited thereto. Incidentally, although FIGS. 7 and 8 illustrate the heat generating component 110*a* with a light source, other embodiments are not limited thereto.

Figure 9:
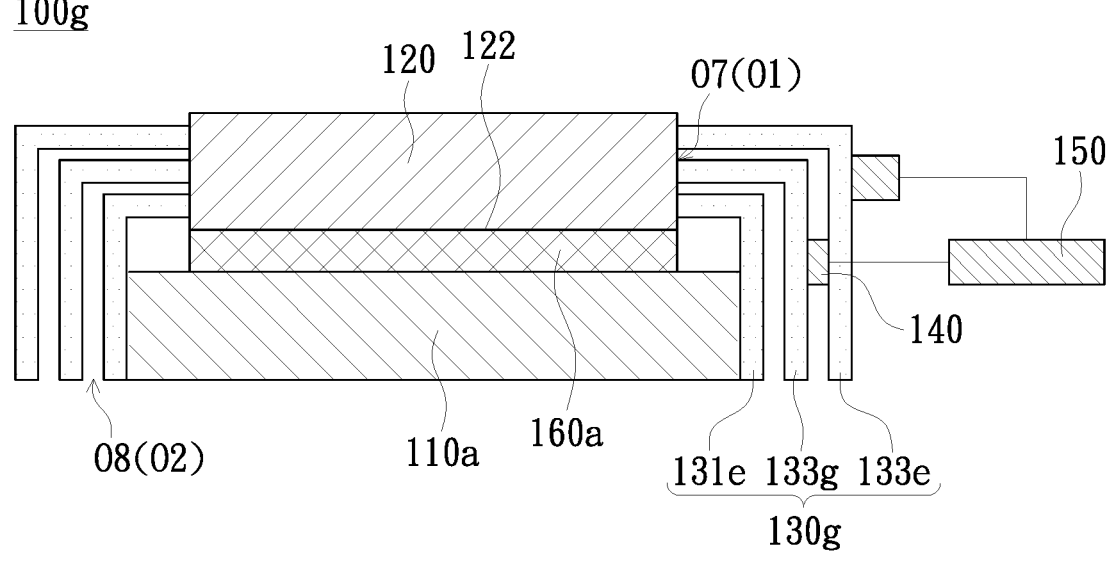
FIG. 9 is a schematic cross-sectional view of a heat dissipation module of a projection device according to another embodiment of the present invention.

FIG. 9 is a schematic cross-sectional view of a heat dissipation module of a projection device according to another embodiment of the present invention. The structure and advantages of the heat dissipation module 100*g* of this embodiment are similar to those of the previous embodiments, and only the differences are described below. Referring to FIG. 9, the heat insulating hollow body 130*g* may further include an intermediate hollow body 133*g*. The intermediate hollow body 133*g* is disposed between the inner hollow body 131*e* and the outer hollow body 132*e*, and is spaced apart from the inner hollow body 131*e* and the outer hollow body 132*e* to further improve the thermal insulation of the heat insulating hollow body 130*g* on the cold end 122 of the thermoelectric cooling chip 120. Specifically, the intermediate hollow body 133*g* may have a seventh opening O7 and an eighth opening O8, the first opening O1 may further include the seventh opening O7, and the second opening O2 may further include the eighth opening O8. The thermal conductivity of the intermediate hollow body 133*g* is, for example, greater than 1 W/m·K, and the material of the intermediate hollow body 133*g* includes, for example, rubber. However, in one embodiment, the material of the intermediate hollow body 133*g* may be different from that of the inner hollow body 131*e* and the outer hollow body 132*e*, and the thickness of the intermediate hollow body 133*g* may also be different from that of the inner hollow body 131*e* and the outer hollow body 132*e*. It can be understood that the number of the intermediate hollow bodies 133*g* in another embodiment may be greater than one, and the specific number may be adjusted according to the requirements of the heat insulation effect, and the present invention is not limited thereto. Incidentally, although FIG. 9 illustrates the heat generating component 110*a* with a light source, other embodiments are not limited thereto.

Figure 10:
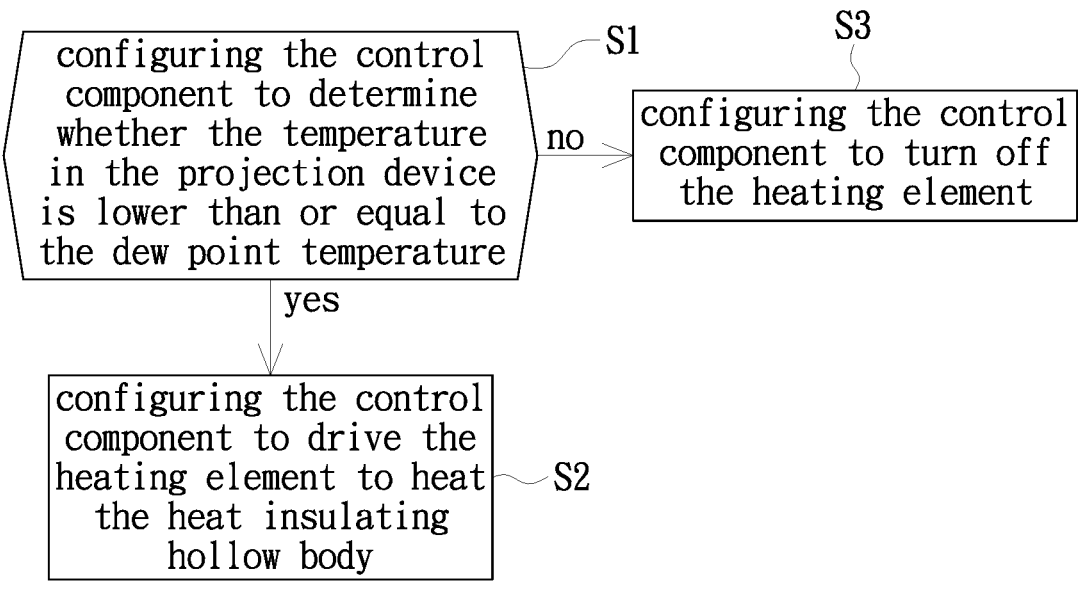
FIG. 10 is a schematic flowchart of an anti-condensation method according to an embodiment of the present invention.

FIG. 10 is a schematic flowchart of an anti-condensation method according to an embodiment of the present invention. Please refer to FIGS. 3 and 10 together. The anti-condensation method is applicable to the heat dissipation module 100 of the projection device in this embodiment; however, it is understood that the anti-condensation method is also applicable to the heat dissipation modules 100*a*, 100*b*, 100*c*, 100*d*, 100*e*, 100*f* and 100*g* of the projection device in other embodiments. The anti-condensation method of this embodiment includes steps S1 to S3. First, performing step S1: configuring the control component 150 to determine whether the temperature in the projection device is lower than or equal to the dew point temperature. Specifically, the control component 150 can measure the temperature of the heat insulating hollow body 130 (shown in FIG. 1) and the air humidity in the projection device and determine whether the temperature in the projection device is lower than or equal to the dew point temperature accordingly. When the temperature in the projection device is lower than or equal to the dew point temperature, then performing step S2: configuring the control component 150 to drive the heating element 140 to heat the heat insulating hollow body 130. In this embodiment, the heating element 140 may heat the heat insulating hollow body 130 by means of thermal conduction, and the thermal conductivity of the heat insulating hollow body 130 may be greater than 1 W/m·K, so that the heat insulating hollow body 130 can be heated up quickly and uniformly. On the contrary, when the temperature in the projection device is greater than the dew point temperature, then performing step S3: configuring the control component 150 to turn off the heating element 140. Specifically, the condensation will not occur when the temperature in the projection device is not lower than or equal to the dew point temperature, so the control component 150 will not activate the heating element 140 in step S3.

Figure 11:
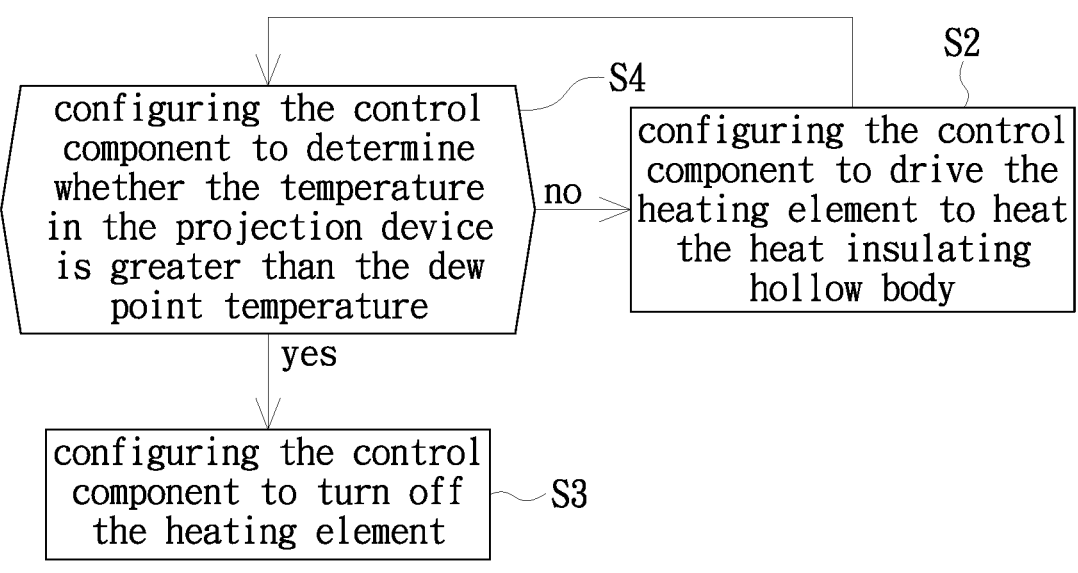
FIG. 11 is a schematic flowchart of the anti-condensation method of FIG. 10 after step S2.

FIG. 11 is a schematic flowchart of the anti-condensation method of FIG. 10 after step S2. Please refer to FIGS. 3 and 11 together to further understand the detailed steps of the anti-condensation method after step S2. After step S2 of configuring the control component 150 to drive the heating element 140 to heat the heat insulating hollow body 130, the anti-condensation method may further include step S4: configuring the control component 150 to determine whether the temperature in the projection device is greater than the dew point temperature. When it is determined that the temperature in the projection device is greater than the dew point temperature, then performing step S3 in FIG. 10: configuring the control component 150 to turn off the heating element 140. Specifically, the temperature in the projection device may be affected by the heating element 140 and increases from lower than (or equal to) the dew point temperature to greater than the dew point temperature, so the control component 150 can turn off the heating element 140 in operation in step S3 to avoid excessive temperature in the projection device and reduce power consumption. On the contrary, when the temperature in the projection device is lower than or equal to the dew point temperature, then performing step S2 in FIG. 10: configuring the control component 150 to drive the heating element 140 to continuously heat the heat insulating hollow body 130.

Figure 12:
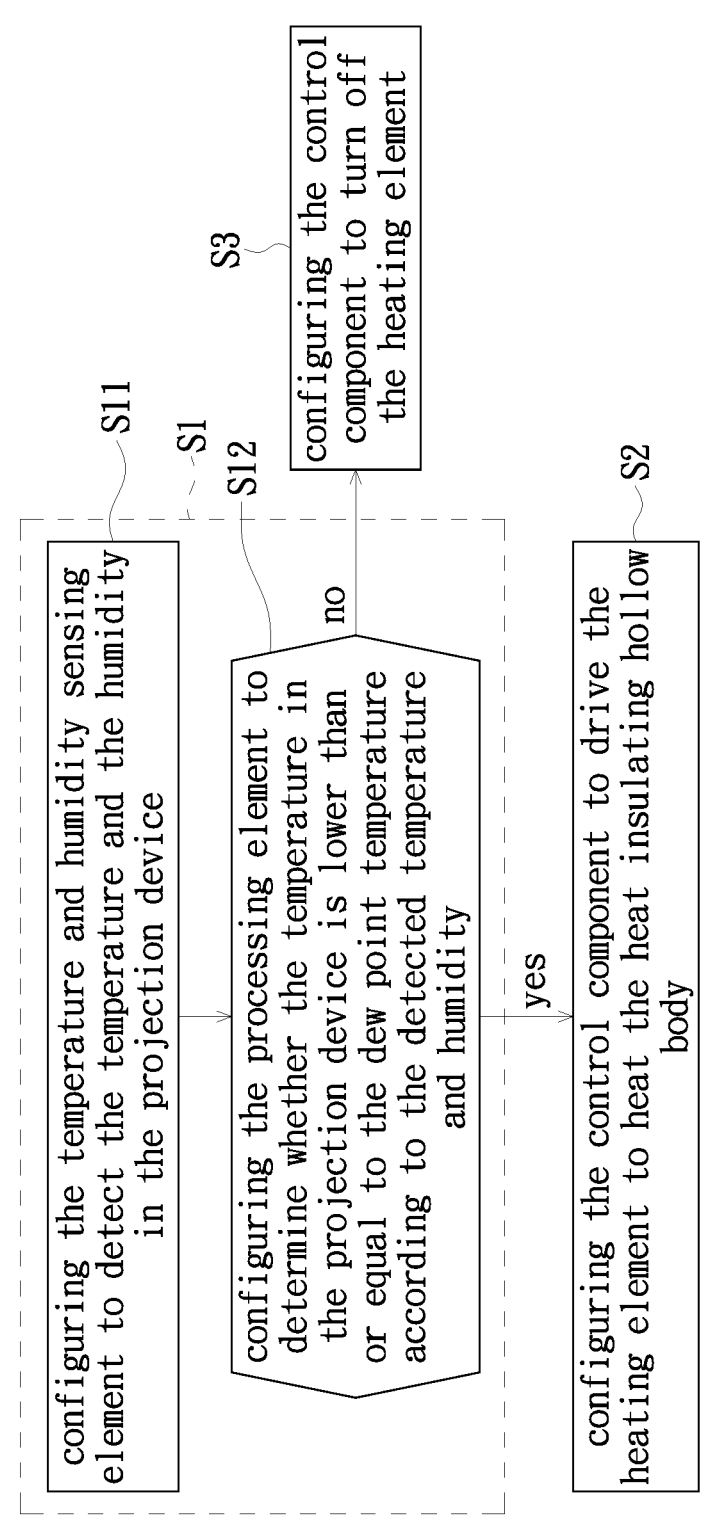
FIG. 12 is a detailed schematic flowchart of step S1 of the anti-condensation method of FIG. 10.

FIG. 12 is a detailed schematic flowchart of step S1 in the anti-condensation method of FIG. 10. Please refer to FIGS. 3 and 12 together to further understand the detailed steps of the anti-condensation method in step S1. In step S1 of configuring the control component 150 to determine whether the temperature in the projection device is lower than or equal to the dew point temperature, the anti-condensation method may further include steps S11 and S12. First, performing step S11: configuring the temperature and humidity sensing element 152 to detect the temperature and the humidity in the projection device. Then, performing step S12: configuring the processing element 151 to determine whether the temperature in the projection device is lower than or equal to the dew point temperature according to the detected temperature and humidity. When it is determined that the temperature in the projection device is lower than or equal to the dew point temperature, then step S2 in FIG. 10 is performed. On the contrary, when it is determined that the temperature in the projection device is greater than the dew point temperature, then step S3 in FIG. 10 is performed. The temperature and humidity sensing element 152 will continuously detect the temperature and humidity in the projection device when the projection device is in operation, so as to continuously perform the anti-condensation method. Specifically, the control component 150 includes a temperature and humidity sensing element 152 and a processing element 151 that are electrically connected to each other. The temperature and humidity sensing element 152 is configured to detect temperature and humidity, and the processing element 151 is configured to determine whether the temperature in the projection device reaches the dew point according to detected temperature and humidity. The features of the temperature and humidity sensing element 152 and the processing element 151 have been described above, and no redundant detail is to be given herein.

The anti-condensation method of the present embodiment is applicable to the heat dissipation module 100 of the projection device (also applicable to the heat dissipation modules 100*a*, 100*b*, 100*c*, 100*d*, 100*e*, 100*f* and 100*g* of the projection device). Compared with the prior art, the dew condensation in the projection device can be effectively prevented, so the service life of the projection device can be prolonged.

In summary, the heat dissipation module of the present invention adopts a heat insulating hollow body to thermally isolate the thermoelectric cooling chip, and the heat insulating hollow body is heated by a heating element when the temperature in the projection device is lower than or equal to the dew point temperature. Thus, the temperature of the heat insulating hollow body can be raised above the dew point temperature, thereby preventing the condensation of water vapor near the heat insulating hollow body due to the low temperature. Therefore, the heat dissipation module of the present invention can effectively prevent condensation from occurring in the projection device. The anti-condensation method of the present invention is applicable to the heat dissipation module of the projection device, and therefore can effectively prevent condensation from occurring in the projection device, so that the service life of the projection device can be prolonged.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first opening, the second opening, the third opening, the fourth opening, the fifth opening, and the sixth opening are only used for distinguishing various elements and do not limit the number of the elements.

What is claimed is:

1. A heat dissipation module of a projection device, the heat dissipation module comprising:
   a heat generating component;
   a thermoelectric cooling chip, having a hot end and a cold end opposite to each other, wherein the cold end is connected to the heat generating component by means of heat conduction;
   a heat insulating hollow body, having a first opening and a second opening that communicate with each other, wherein the thermoelectric cooling chip is disposed in the first opening and seals the first opening, the cold end is located in the heat insulating hollow body, and the heat generating component is disposed in the second opening and seals the second opening;
   a heating element, configured to heat the heat insulating hollow body; and
   a control component, electrically connected to the heating element, wherein the control component is configured to determine whether a temperature in the projection device is lower than or equal to a dew point temperature, and the control component drives the heating element to heat the heat insulating hollow body accordingly in response to the temperature in the projection device being lower than or equal to the dew point temperature.

2. The heat dissipation module of the projection device according to claim 1, wherein a thermal conductivity of the heat insulating hollow body is greater than 1 W/m·K.

3. The heat dissipation module of the projection device according to claim 2, wherein a material of the heat insulating hollow body comprises rubber.

4. The heat dissipation module of the projection device according to claim 1, further comprising a heat insulating layer, wherein the heat insulating hollow body has an inner surface and an outer surface opposite to each other, the heat insulating layer is disposed on the inner surface, and a thermal conductivity of the heat insulating layer is less than a thermal conductivity of the heat insulating hollow body.

5. The heat dissipation module of the projection device according to claim 4, wherein a material of the heat insulating layer comprises sponge.

6. The heat dissipation module of the projection device according to claim 5, wherein the heat insulating layer connects the thermoelectric cooling chip and the heat generating component.

7. The heat dissipation module of the projection device according to claim 4, wherein the heating element is disposed on the inner surface or the outer surface of the heat insulating hollow body.

8. The heat dissipation module of the projection device according to claim 7, wherein the heating element is disposed on the inner surface of the heat insulating hollow body, and the heat insulating layer covers the heating element.

9. The heat dissipation module of the projection device according to claim 1, wherein:
   the heat insulating hollow body comprises an inner hollow body and an outer hollow body, the inner hollow body and the outer hollow body are spaced apart from each other, the first opening comprises a third opening of the outer hollow body and a fourth opening of the inner hollow body, and the second opening comprises a fifth opening of the outer hollow body and a sixth opening of the inner hollow body;
   the thermoelectric cooling chip seals at least the fourth opening, the cold end is located in the inner hollow body, the heat generating component seals at least the sixth opening, and the heating element is configured to heat the outer hollow body.

10. The heat dissipation module of the projection device according to claim 9, wherein materials of the inner hollow body and the outer hollow body comprise rubber.

11. The heat dissipation module of the projection device according to claim 9, wherein the inner hollow body and the outer hollow body have different thicknesses.

12. The heat dissipation module of the projection device according to claim 9, wherein the heat insulating hollow body further comprises an intermediate hollow body, and the intermediate hollow body is disposed between the inner hollow body and the outer hollow body and is spaced apart from the inner hollow body and the outer hollow body.

13. The heat dissipation module of the projection device according to claim 12, wherein a material of the intermediate hollow body comprises rubber.

14. The heat dissipation module of the projection device according to claim 1, wherein the heat generating component comprises a light valve or a light source.

15. The heat dissipation module of the projection device according to claim 14, wherein the heat generating component comprises the light valve and further comprises a circuit board, the light valve is electrically connected to the circuit board, the circuit board is disposed in the second opening and seals the second opening, and the light valve is disposed outside the heat insulating hollow body.

16. The heat dissipation module of the projection device according to claim 14, wherein the heat generating component comprises the light source, and the light source is disposed in the second opening and seals the second opening.

17. The heat dissipation module of the projection device according to claim 1, further comprising a thermally conductive element, wherein the thermally conductive element is connected between the heat generating component and the cold end, and the thermally conductive element is located in the heat insulating hollow body.

18. The heat dissipation module of the projection device according to claim 1, wherein the control component comprises a processing element and a temperature and humidity sensing element, the processing element is electrically connected to the temperature and humidity sensing element and the heating element, the temperature and humidity sensing element is configured to detect the temperature and a humidity in the projection device, and the processing element is configured to drive the heating element to heat the heat insulating hollow body accordingly.

19. The heat dissipation module of the projection device according to claim 18, wherein the temperature and humidity sensing element is disposed on an outer surface of the heat insulating hollow body.

20. The heat dissipation module of the projection device according to claim 18, wherein the temperature and humidity sensing element comprises a temperature sensing member and a humidity sensing member, the temperature sensing member is disposed on an outer surface of the heat insulating hollow body for detecting the temperature of the heat insulating hollow body in the projection device, and the humidity sensing member is disposed in the projection device for detecting the humidity nearby the heat insulating hollow body in the projection device.

21. An anti-condensation method applicable to a heat dissipation module of a projection device, wherein the heat dissipation module of the projection device comprises a heat generating component, a thermoelectric cooling chip, a heat insulating hollow body, a heating element and a control component, a cold end of the thermoelectric cooling chip is connected to the heat generating component by means of heat conduction, the heat insulating hollow body has a first opening and a second opening that communicate with each other, the thermoelectric cooling chip is disposed in the first opening and seals the first opening, the cold end is located in the heat insulating hollow body, the heat generating component is disposed in the second opening and seals the second opening, the heating element is configured to heat the heat insulating hollow body, the control component is electrically connected to the heating element, and the anti-condensation method comprises steps of:

determining whether a temperature in the projection device is lower than or equal to a dew point temperature by the control component; and driving the heating element to heat the heat insulating hollow body by the control component in response to the temperature in the projection device being lower than or equal to the dew point temperature.

22. The anti-condensation method according to claim 21, wherein after the step of driving the heating element to heat the heat insulating hollow body by the control component, the anti-condensation method further comprises steps of:

determining whether the temperature in the projection device is greater than the dew point temperature by the control component, and turning off the heating element by the control component in response to the temperature in the projection device is being greater than the dew point temperature.

23. The anti-condensation method according to claim 21, wherein the control component comprises a processing element and a temperature and humidity sensing element, the processing element is electrically connected to the temperature and humidity sensing element and the heating element, wherein the step of determining whether the temperature in the projection device is lower than or equal to the dew point temperature by the control component further comprises steps of:

detecting the temperature and a humidity in the projection device by the temperature and humidity sensing element; and determining whether the temperature in the projection device is lower than or equal to the dew point temperature according to the detected temperature and the humidity by the processing element.

* * * * *